(12) United States Patent
Agarwala et al.

(10) Patent No.: US 7,162,411 B2
(45) Date of Patent: Jan. 9, 2007

(54) DYNAMIC DATA TRACE OUTPUT SCHEME

(75) Inventors: Manisha Agarwala, Richardson, TX (US); Maria B. H. Gill, Plano, TX (US); John M. Johnsen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 693 days.

(21) Appl. No.: 10/302,026

(22) Filed: Nov. 22, 2002

(65) Prior Publication Data

US 2004/0102954 A1    May 27, 2004

(51) Int. Cl.
    *G06F 17/50*    (2006.01)
    *G06F 9/455*    (2006.01)
(52) U.S. Cl. .............. 703/28; 703/13; 703/19; 703/26; 716/5
(58) Field of Classification Search ............. 703/28, 703/19, 13, 26; 716/5
    See application file for complete search history.

(56) References Cited

U.S. PATENT DOCUMENTS

| 6,912,675 | B1 * | 6/2005 | Swoboda ............... 714/45 |
| 6,918,065 | B1 * | 7/2005 | Edwards et al. ......... 714/45 |
| 6,985,848 | B1 * | 1/2006 | Swoboda et al. ........ 703/26 |
| 2001/0034597 | A1 * | 10/2001 | Swoboda et al. ........ 703/26 |
| 2002/0055828 | A1 * | 5/2002 | Swoboda et al. ........ 703/13 |
| 2002/0055830 | A1 * | 5/2002 | Swoboda et al. ........ 703/19 |
| 2002/0055831 | A1 * | 5/2002 | Swoboda ............... 703/19 |
| 2002/0065642 | A1 * | 5/2002 | Swoboda ............... 703/19 |
| 2005/0138483 | A1 * | 6/2005 | Hatonen et al. ........ 714/45 |

* cited by examiner

*Primary Examiner*—Hugh Jones
*Assistant Examiner*—David Silver
(74) *Attorney, Agent, or Firm*—Robert D. Marshall, Jr.; W. James Brady; Frederick J. Telecky, Jr.

(57) ABSTRACT

Data streams are generated for tracing target processor activity. When multiple streams are on, they are written at different times into their individual FIFO. It is possible that for a specific stream, the length and fields of the data that should be exported vary. This invention is a scheme to send out only the relevant fields.

6 Claims, 5 Drawing Sheets

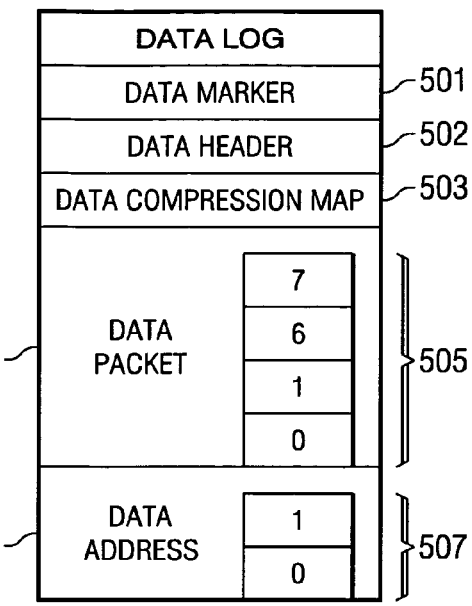
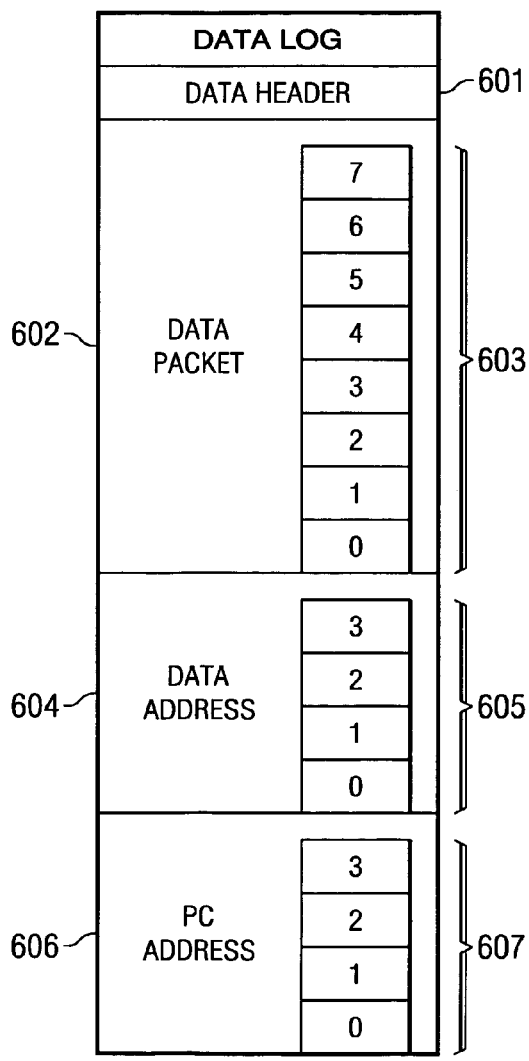
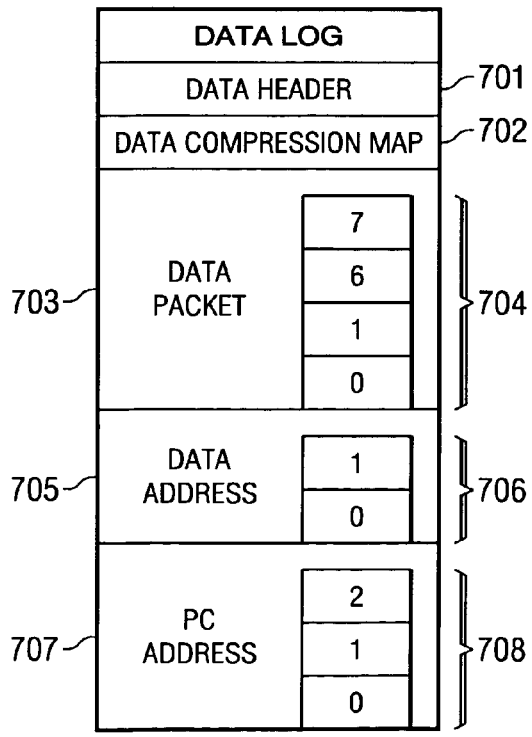

DYNAMIC DATA TRACE OUTPUT SCHEME

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace.

Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates a prior art emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 110 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T; TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

Data streams are generated for tracing target processor activity. When multiple streams are on, they are written at different times into their individual FIFO. It is possible that for a specific stream, the length and fields of the data that should be exported vary. This invention is a scheme to send out only the relevant fields.

BRIEF DESCRIPTION OF THE DRAWINGS

These and other aspects of this invention are illustrated in the drawings, in which:

FIG. 4 illustrates a first example of a trace data log;

FIG. 5 illustrates a second example of a trace data log;

FIG. 6 illustrates a third example of a trace data log;

FIG. 7 illustrates a fourth example of a trace data log;

DETAILED DESCRIPTION OF PREFERRED EMBODIMENTS

When the streams are switched on or off using the triggers, markers are generated. Various streams are synchronized using markers called sync points. The sync points provide a unique identifier field and a context to the data that will follow it. All streams may generate a sync point with this unique identifier.

The information in the sync point is valid only at a legal instruction boundary.

Figure 1:
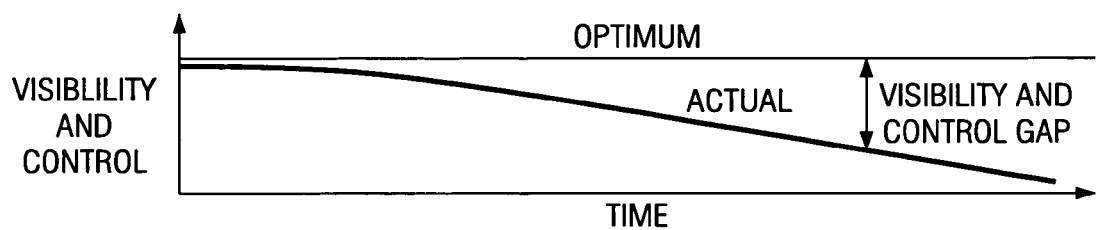
FIG. 1 illustrates the visibility and control of typical integrated circuits as a function of time due to increasing system integration.
Figure 2:
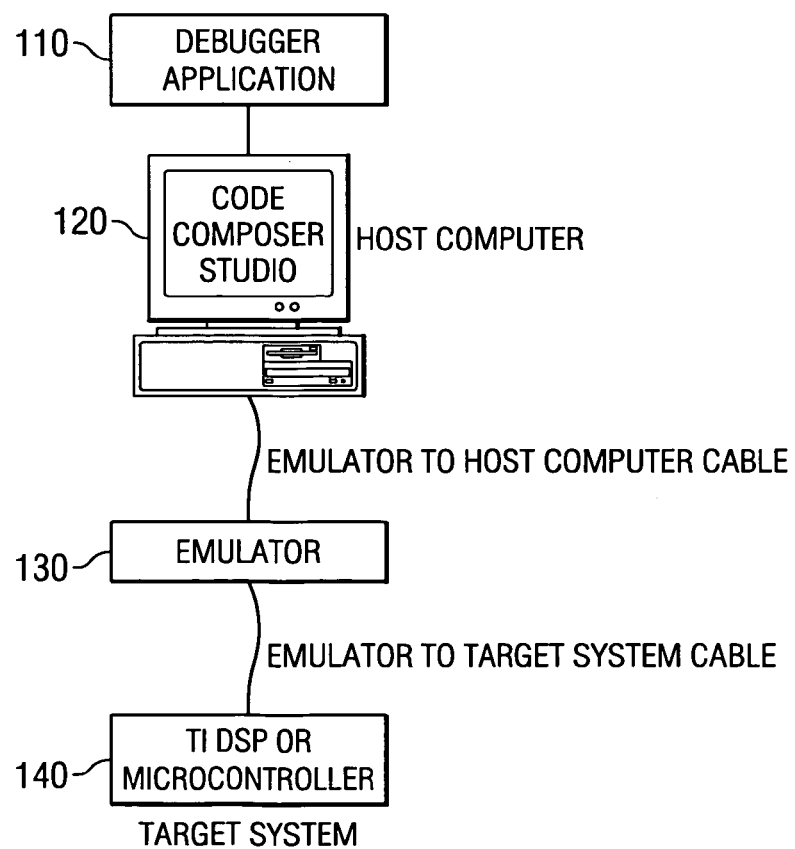
FIG. 2 illustrates an emulation system to which this invention is applicable (prior art)
Figure 3:
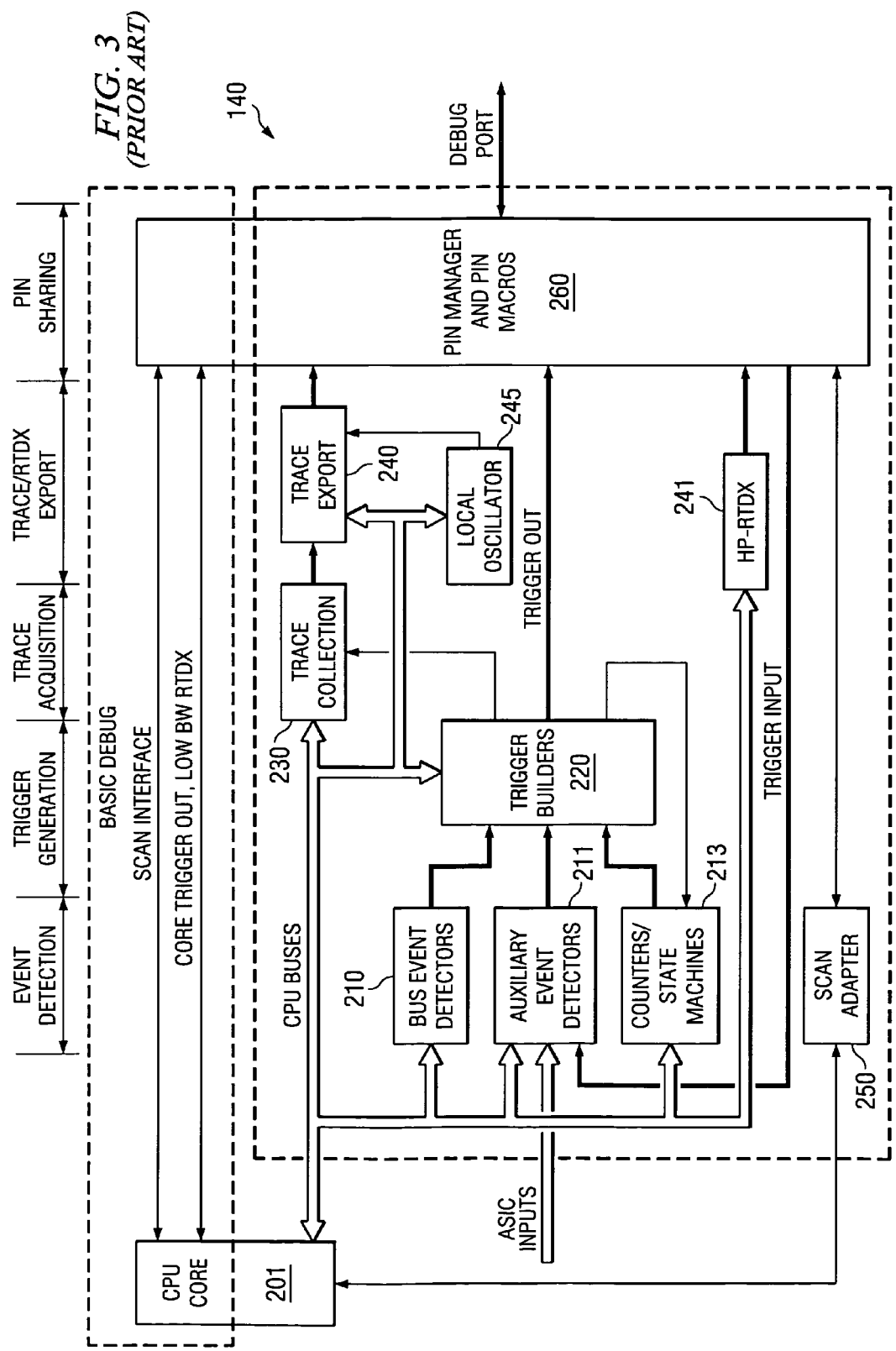
FIG. 3 illustrates in block diagram form a typical integrated circuit employing configurable emulation capability (prior art)

FIG. 3 illustrates an example of a prior art one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and realtime data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

For the case of tracing processor activity, data streams are generated which log various aspects of the memory logs. Examples of aspects that can be traced include: data marker only; data only; data address; program counter address. These aspects can be varied using compression techniques. FIGS. 4 to 7 illustrate examples of the various possibilities.

FIG. 4 illustrates the simplest example. It is possible that data log 400 includes only data marker 401.

FIG. 5 illustrates a second example. Data log 500 includes data marker 501, data header 502, data compression map 503, data packet section 504 including data entries 505 and data address section 506 including data addresses 507. Data header 502 indicates that only data and data addresses are included and that no program counter addresses are included. Data compression map 503 indicates which portions of the data and of the data addresses are transmitted. In the case of FIG. 5, data compression map 503 indicates that data packet section 504 includes only bytes 1, 2, 7 and 8 and that data address section 506 includes only bytes 1 and 2.

FIG. 6 illustrates an example having no compression or sign extension and a maximum data size. Data log 600 includes data header 601, data packet section 602 including data entries 603 for bytes 1 to 8, data address section 604 including data address entries 605 for bytes 1 to 4 and program counter address section 606 including program counter address entries 607 for bytes 1 to 4.

FIG. 7 illustrates the same data log with a compression map. Data log 700 includes data header 701, data compression map 702, data packet section 703 including data entries 704, data address section 705 including data address entries 706 and program counter address section 707 including program counter address entries 708. All the data packets are not transmitted. Data compression map 702 indicates that only data bytes 1, 2, 7 and 8 are included. Data compression map 702 further indicates that only bytes 1 and 2 of the data address and only bytes 1 to 3 of the program counter address are included.

It is evident that there are many variations possible in the trace logs. Emulator 130 reading the trace logs has no knowledge of what is transmitted. The data compression technique can change from one data log to the next. Therefore the transmitter must transmit the complete information to the read side. Each packet is padded with a valid bit. The read side of the trace FIFO buffer uses that bit to determine whether that packet should be transmitted.

This is a summary of all the issues related to data trace. The presence of data marker is completely random. Data markers can have unique identifiers (ID). For example, the encoding can be "0000011XXX" where the last three bits encode the ID value. Data markers may not have any IDs and just have a fixed encoding which is completely different from the ID marker. The data log does not require the data header. The data compression map is optional. The data value can be a maximum of 8 bytes when present. However some bytes may not be transmitted. The skipped bytes need not be consecutive. It is possible to transmit bytes 1 and 3 but skip 0 and 2 for 32 bit wide data. In this case bytes 4 through 7 do not matter. Those bytes are only relevant for 64 bit data. The data address when present can have a maximum of 4 bytes. However, the data address can also be compressed. Thus some of the bytes need to be sent. In this case, the skipped bytes can be only the upper bytes and at least one byte has to be transmitted. The program counter address when present can be a maximum of 4 bytes. However, the program counter address may also be compressed under the same restrictions as the data address.

All the parts of a complete data log do not have to be present. However the following restrictions exist. Either a data marker or a data header has to be present. Only one of marker types can be present. If the data header is present, at least one of the compression map, data value, data address or program counter address must be present.

Table 1 shows each data entry in the data FIFO buffer.

TABLE 1

| Bit number/range | Bit(s) used for |
| --- | --- |
| 0 | Data marker valid |
| 1 | Data marker type |
| 2–4 | Data marker value |
| 5 | Header valid |
| 6–15 | Header value |
| 16 | Data compression valid |
| 17–26 | Data compression value |
| 27 | Data byte 0 valid |
| 28–37 | Data byte 0 value |
| 39 | Data byte 1 valid |
| 40–49 | Data byte 1 value |
| 50 | Data byte 2 valid |
| 51–60 | Data byte 2 value |
| 61 | Data byte 3 valid |

TABLE 1-continued

| Bit number/range | Bit(s) used for |
|---|---|
| 62–71 | Data byte 3 value |
| 72 | Data byte 4 valid |
| 73–82 | Data byte 4 value |
| 83 | Data byte 5 valid |
| 84–93 | Data byte 5 value |
| 94 | Data byte 6 valid |
| 95–104 | Data byte 6 value |
| 105 | Data byte 7 valid |
| 106–115 | Data byte 7 value |
| 116 | Data address byte 0 valid |
| 117–126 | Data address byte 0 value |
| 127 | Data address byte 1 valid |
| 128–137 | Data address byte 1 value |
| 138 | Data address byte 2 valid |
| 139–148 | Data address byte 2 value |
| 149 | Data address byte 3 valid |
| 150–159 | Data address byte 3 value |
| 160 | PC address byte 0 valid |
| 161–170 | PC address byte 0 value |
| 171 | PC address byte 1 valid |
| 172–181 | PC address byte 1 value |
| 182 | PC address byte 2 valid |
| 183–192 | PC address byte 2 value |
| 193 | PC address byte 3 valid |
| 194–203 | PC address byte 3 value |

There are various optimizations possible to minimize the size of the trace FIFO buffer. These include the following. Any the reserved bits in each of the packets can be omitted in the trace FIFO buffer. These reserved bits can be reconstituted on read once the kind of packet is being sent is known. The sync IDs to are restricted to the range from 1 to 7. Therefore instead of having a separate marker type, an ID of 0 can be reserved for the non-ID marker type. The data compression value can be reconstructed based on the valid bits for each of the data bytes. The data address byte 0 valid value can be determined from the header (bits 0 to 15). This header has the information about the presence or absence of a data address in the data log. The program counter address byte 0 valid value can also be determined from the header. The header indicates the presence or absence of a program counter address in the data log.

Table 2 shows application of these optimizations to the data shown in Table 1. This illustrates saving a significant amount of data (nearly 50 bits).

TABLE 2

| Bit number/range | Bit(s) used for |
|---|---|
| 0 | Data marker valid |
| 1–3 | Data marker value |
| 4 | Header valid |
| 5–10 | Header value |
| 11 | Data compression valid |
| 12 | Data byte 0 valid |
| 13–20 | Data byte 0 value |
| 21 | Data byte 1 valid |
| 22–29 | Data byte 1 value |
| 30 | Data byte 2 valid |
| 41–48 | Data byte 2 value |
| 49 | Data byte 3 valid |
| 50–57 | Data byte 3 value |
| 58 | Data byte 4 valid |
| 59–66 | Data byte 4 value |
| 67 | Data byte 5 valid |
| 68–75 | Data byte 5 value |
| 76 | Data byte 6 valid |
| 77–84 | Data byte 6 value |
| 85 | Data byte 7 valid |
| 86–93 | Data byte 7 value |
| 94–101 | Data address byte 0 value |

TABLE 2-continued

| Bit number/range | Bit(s) used for |
|---|---|
| 102 | Data address byte 1 valid |
| 103–110 | Data address byte 1 value |
| 111 | Data address byte 2 valid |
| 112–119 | Data address byte 2 value |
| 120 | Data address byte 3 valid |
| 121–128 | Data address byte 3 value |
| 129–138 | PC address byte 0 value |
| 139 | PC address byte 1 valid |
| 140–147 | PC address byte 1 value |
| 148 | PC address byte 2 valid |
| 149–156 | PC address byte 2 value |
| 157 | PC address byte 3 valid |
| 158–165 | PC address byte 3 value |

Besides this FIFO information, the following additional information is transmitted to the read side of the FIFO buffer. This additional information also impacts the state machine transition. Did the data FIFO gets corrupted due to any reason? Is there a compulsory marker (ID) in the FIFO? Is the next block ready to accept more data (pak_rd)?

FIGS. 8 to 11 illustrate state diagrams including the state transitions needed to read the data correctly. The following uses these fields as follows: cor_id signals data corruption with compulsory ID; cor signals data corruption without compulsory ID; dataadd is the data address being traced; pcadd is the program counter address being traced; fifo_empty indicates that the trace FIFO buffer is empty and there are no more data logs pending transmission; id_nxt indicates that the only ID is the next entry in the FIFO buffer; header_nxt indicates there is valid header information in the next entry of the FIFO buffer; cur_id indicates an ID present in the current FIFO entry; cur_header indicates valid header information in the current FIFO entry; and nxt_st indicates the next state. States B, C, E, F and G will be explained below.

State machine 800 starts in IDLE state 801. If no packet data is present (pak_rdy=0) and the FIFO buffer is empty (fifo_empty), the state remains at IDLE state 801. If a current ID is present (cur_id=1) and there is no current header (cur_header=0), the state machine 800 moves to ID_ONLY state 802. State machine 800 moves from ID_ONLY state 802 to branch B (not shown in FIG. 8) if the ID is corrupted (cor_id). State machine 800 moves from ID_ONLY state 802 to branch C (not shown in FIG. 8) if the data is corrupted (cor). State machine 800 remains in ID_ONLY state 802 if a next ID is present (nxt_id=1) and there is no next header (nxt_header=0). State machine 800 returns to IDLE state 801 if the FIFO buffer is empty (fifo_empty).

State machine 800 moves from IDLE state 801 to ID state 803 if a current ID is present (cur_id=1) and a current header is present (cur_header=1). After servicing the ID, state machine 800 automatically moves from ID state 803 to HEADER state 804. State machine 800 moves from IDLE state 801 to HEADER state 804 if a current ID is not present (cur_id=0) and a current header is present (cur_header=1). From HEADER state 804 state machine 800 moves: to branch E (not shown in FIG. 8) if the is some valid data; to branch F (not shown in FIG. 8) if there is no valid data but the data address is valid; and to branch G (not shown in FIG. 8) if there is no valid data or valid data address.

Figure 8:
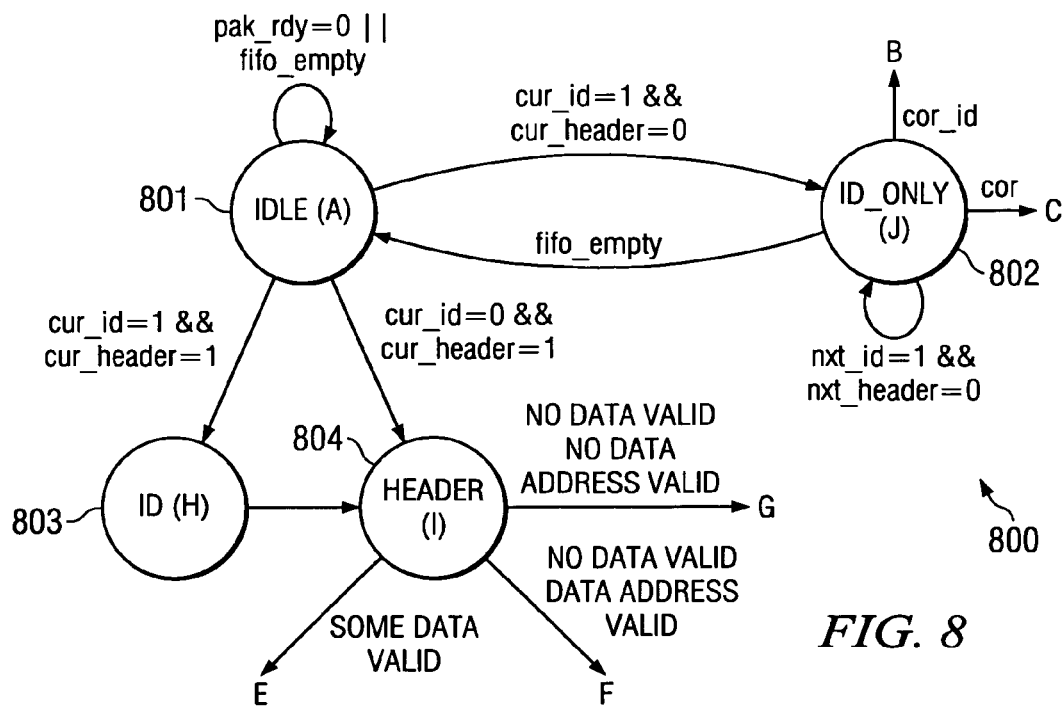
FIG. 8 illustrates a state diagram of a state machine capable of reading the compressed trace data logs.

Table 3 shows the reading of data values corresponding to branch E in FIG. 8. The column headings in Table 3 are: cur_st is the current state; nxt_st is the next state; comp indicates that the compression map is valid; data0 . . . 7 corresponds to the 8 respective data bytes 0 to 7 valid. Data7 is the most significant byte; and Data_nxt_tbl is shown in Table 4. If the data compression map is 0, then byte 0 of the data must be valid, because a data compression map of 0 indicate no data compression.

Table 4 shows how the next state (nxt_st) depends on the status of the corrupt ID signal (cor-id), the corrupt data signal (cor), the data address present signal (dataadd), the program counter address present signal (pcadd), the FIFO buffer empty signal (fifo_empty), the next ID signal (id_nxt) and the next header signal (header_nxt). The COR_WID and COR_ONLY states are shown in FIG. 11. The DATA_ADD state is the entry state to branch F illustrated in FIG. 9. The PC_ADD state is the entry state to branch G illustrated in FIG. 10. The IDLE, ID_ONLY, ID and HEADER states are illustrated in FIG. 8.

Figure 9:
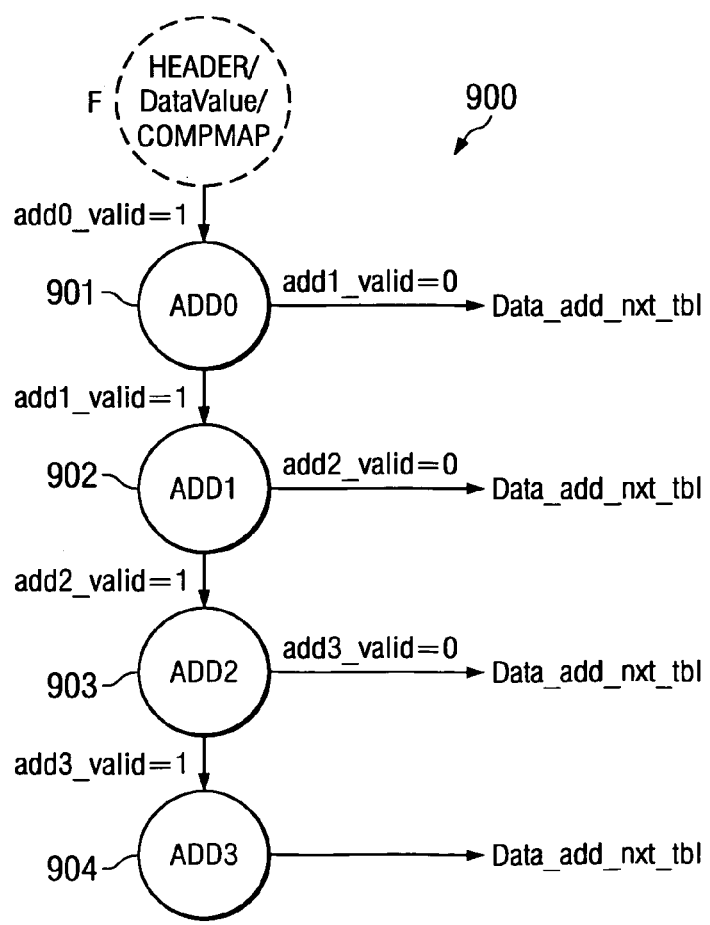
FIG. 9 illustrates a state diagram of the branch of the state machine handling read of data addresses.

FIG. 9 illustrates the reading of data address values corresponding to the branch F of FIG. 8. State machine 900 is entered via branch F from HEADER state 804 illustrated in FIG. 8 when there is no valid data but some valid data address bytes. If the valid bit for address byte 0 indicates valid data (add0_valid=1), then ADD0 state 901 reads this byte of data address. If address byte 1 is not valid (add1_valid=0), then state machine 900 branches to Data_add_nxt_tbl shown below in Table 5. If address byte 1 is valid (add1_valid=1), then ADD1 state 902 reads this

TABLE 3

| Cur_st | Comp | Data0 | Data1 | Data2 | Data3 | Data4 | Date5 | Data6 | Data7 | Nxt_st |
|---|---|---|---|---|---|---|---|---|---|---|
| Header | 0 | — | — | — | — | — | — | — | — | D0 |
| Header | 1 | — | — | — | — | — | — | — | — | Cmap |
| Cmap | — | 0 | 0 | 0 | 0 | 0 | 0 | 0 | 0 | Data_nxt_tbl |
| Cmap | — | 0 | 0 | 0 | 0 | 0 | 0 | 0 | 1 | D7 |
| Cmap | — | 0 | 0 | 0 | 0 | 0 | 0 | 1 | — | D6 |
| Cmap | — | 0 | 0 | 0 | 0 | 0 | 1 | — | — | D5 |
| Cmap | — | 0 | 0 | 0 | 0 | 1 | — | — | — | D4 |
| Cmap | — | 0 | 0 | 0 | 1 | — | — | — | — | D3 |
| Cmap | — | 0 | 0 | 1 | — | — | — | — | — | D2 |
| Cmap | — | 0 | 1 | — | — | — | — | — | — | D1 |
| Cmap | — | 1 | — | — | — | — | — | — | — | D0 |
| D0 | — | — | 0 | 0 | 0 | 0 | 0 | 0 | 0 | Data_nxt_tbl |
| D0 | — | — | 0 | 0 | 0 | 0 | 0 | 0 | 1 | D7 |
| D0 | — | — | 0 | 0 | 0 | 0 | 0 | 1 | — | D6 |
| D0 | — | — | 0 | 0 | 0 | 0 | 1 | — | — | D5 |
| D0 | — | — | 0 | 0 | 0 | 1 | — | — | — | D4 |
| D0 | — | — | 0 | 0 | 1 | — | — | — | — | D3 |
| D0 | — | — | 0 | 1 | — | — | — | — | — | D2 |
| D0 | — | — | 1 | — | — | — | — | — | — | D1 |
| D1 | — | — | — | 0 | 0 | 0 | 0 | 0 | 0 | Data_nxt_tbl |
| D1 | — | — | — | 0 | 0 | 0 | 0 | 0 | 1 | D7 |
| D1 | — | — | — | 0 | 0 | 0 | 0 | 1 | — | D6 |
| D1 | — | — | — | 0 | 0 | 0 | 1 | — | — | D5 |
| D1 | — | — | — | 0 | 0 | 1 | — | — | — | D4 |
| D1 | — | — | — | 0 | 1 | — | — | — | — | D3 |
| D1 | — | — | — | 1 | — | — | — | — | — | D2 |
| D2 | — | — | — | — | 0 | 0 | 0 | 0 | 0 | Data_nxt_tbl |
| D2 | — | — | — | — | 0 | 0 | 0 | 0 | 1 | D7 |
| D2 | — | — | — | — | 0 | 0 | 0 | 1 | — | D6 |
| D2 | — | — | — | — | 0 | 0 | 1 | — | — | D5 |
| D2 | — | — | — | — | 0 | 1 | — | — | — | D4 |
| D2 | — | — | — | — | 1 | — | — | — | — | D3 |
| D3 | — | — | — | — | — | 0 | 0 | 0 | 0 | Data_nxt_tbl |
| D3 | — | — | — | — | — | 0 | 0 | 0 | 1 | D7 |
| D3 | — | — | — | — | — | 0 | 0 | 1 | — | D6 |
| D3 | — | — | — | — | — | 0 | 1 | — | — | D5 |
| D3 | — | — | — | — | — | 1 | — | — | — | D4 |
| D4 | — | — | — | — | — | — | 0 | 0 | 0 | Data_nxt_tbl |
| D4 | — | — | — | — | — | — | 0 | 0 | 1 | D7 |
| D4 | — | — | — | — | — | — | 0 | 1 | — | D6 |
| D4 | — | — | — | — | — | — | 1 | — | — | D5 |
| D5 | — | — | — | — | — | — | — | 0 | 0 | Data_nxt_tbl |
| D5 | — | — | — | — | — | — | — | 0 | 1 | D7 |
| D5 | — | — | — | — | — | — | — | 1 | — | D6 |
| D6 | — | — | — | — | — | — | — | — | 0 | Data_nxt_tbl |
| D6 | — | — | — | — | — | — | — | — | 1 | D7 |
| D7 | — | — | — | — | — | — | — | — | — | Data_nxt_tbl |

Table 4 shows the function Data_nxt_tbl which defines the next state for several of the entries of Table 3.

TABLE 4

| cor_i | co | dataad | pcad | fifo_emp | id_nx | header_n | nxt_st |
|---|---|---|---|---|---|---|---|
| 1 | — | — | — | — | — | — | COR_WID |
| 0 | 1 | — | — | — | — | — | COR_ONLY |
| 0 | 0 | 1 | — | — | — | — | DATA_ADD |
| 0 | 0 | 0 | 1 | — | — | — | PC_ADD |
| 0 | 0 | 0 | 0 | 1 | — | — | IDLE |
| 0 | 0 | 0 | 0 | 0 | 1 | 0 | ID_ONLY |
| 0 | 0 | 0 | 0 | 0 | 1 | 1 | ID |
| 0 | 0 | 0 | 0 | 0 | 0 | — | HEADER | address byte. If address byte 2 is invalid (add2_valid=0), then state machine 900 branches to Data_add_nxt_tbl. If address byte 2 is valid (add2_valid=1), then ADD2 state 903 reads this address byte. If address byte 3 is invalid (add3_valid=0), then state machine 900 branches to Data_add_nxt_tbl. If address byte 3 is valid (add3_valid=1), then ADD3 state 904 reads this address byte and then state machine 900 branches to Data_add_nxt_tbl.

Table 5 shows the Data_add_nxt_tbl referred to with regard to FIG. 9.

TABLE 5

| cor_id | cor | pcadd | fifo_empty | id_nxt | header_nxt | nxt_st |
|---|---|---|---|---|---|---|
| 1 | — | — | — | — | — | COR_WID |
| 0 | 1 | — | — | — | — | COR_ONLY |
| 0 | 0 | 1 | — | — | — | PC_ADD |
| 0 | 0 | 0 | 1 | — | — | IDLE |
| 0 | 0 | 0 | 0 | 1 | 0 | ID_ONLY |
| 0 | 0 | 0 | 0 | 1 | 1 | ID |
| 0 | 0 | 0 | 0 | 0 | — | HEADER |

Figure 10:
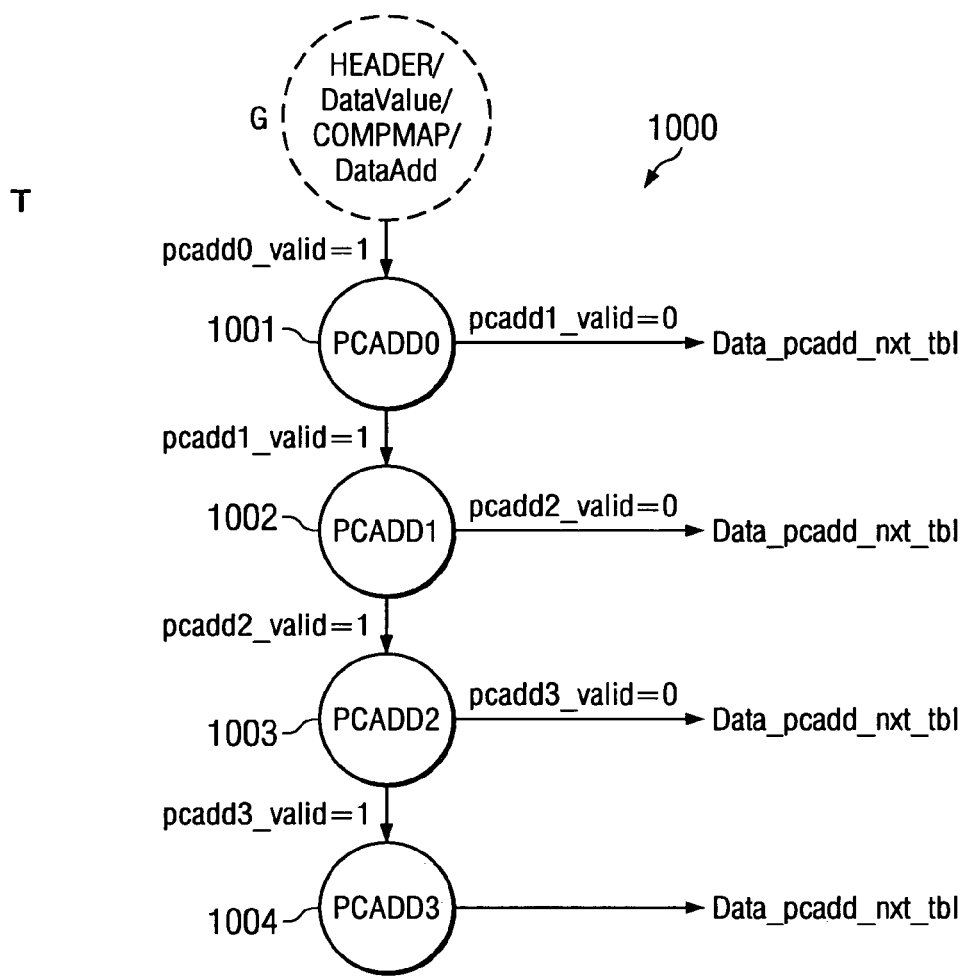
FIG. 10 illustrates a state diagram of the branch of the state machine handling read of program counter addresses.
Figure 11:
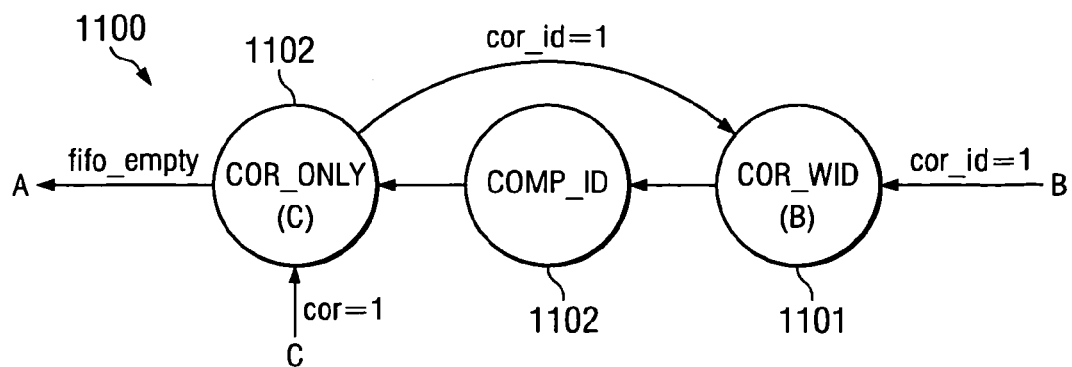
FIG. 11 illustrates a state diagram of the branch of the state machine handling corrupted data or IDs.

FIG. 10 illustrates the reading of data address values corresponding to the branch G of FIG. 8. State machine 1000 is entered via branch G from HEADER state 804 illustrated in FIG. 8 when there is no valid data and no valid data address bytes. If the valid bit for program counter address byte 0 indicates valid data (pcadd0_valid=1), then PCADD0 state 1001 reads this byte of data address. If program counter address byte 1 is not valid (pcadd1_valid=0), then state machine 1000 branches to Data_pcadd_nxt_tbl shown below in Table 6. If program counter address byte 1 is valid (pcadd1_valid=1), then PCADD1 state 1002 reads this program counter address byte. If program counter address byte 2 is invalid (pcadd2_valid=0), then state machine 1000 branches to Data_pcadd_nxt_tbl. If program counter address byte 2 is valid (pcadd2_valid=1), then PCADD2 state 1003 reads this program counter address byte. If program counter address byte 3 is invalid (pcadd3_valid=0), then state machine 1000 branches to Data_pcadd_nxt_tbl. If program counter address byte 3 is valid (pcadd3_valid=1), then PCADD3 state 1004 reads this program counter address byte and then state machine 900 branches to Data_pcadd_nxt_tbl.

Table 6 shows the Data_pcadd_nxt_tbl referred to with regard to FIG. 10.

TABLE 6

| cor_id | cor | fifo_empty | id_nxt | header_nxt | nxt_st |
|---|---|---|---|---|---|
| 1 | — | — | — | — | COR_WID |
| 0 | 1 | — | — | — | COR_ONLY |
| 0 | 0 | 1 | — | — | IDLE |
| 0 | 0 | 0 | 1 | 0 | ID_ONLY |
| 0 | 0 | 0 | 1 | 1 | ID |
| 0 | 0 | 0 | 0 | — | HEADER |

FIG. 11 illustrates recovery from corruption. If there is data corruption with compulsory ID (cor_id=1), then state machine 1100 enters COR_WID state 1101. An entry point is illustrated in FIG. 8 from ID_ONLY state 802 (branch B). However, the state machine branches to COR_WID state 1101 for any detection of data corruption with a compulsory ID (cor_id=1). State machine 1100 automatically transits to COMP_ID state 1103 and then to COR_ONLY state 1102. Another entry point to COR_ONLY state 1102 is illustrated in FIG. 8 (branch C) if the data is corrupted (cor=1). However, the state machine branches to COR_ONLY state 1103 for any detection of data corruption (cor=1). The state machine may branch from COR_ONLY state 1103 to COR_WID state 1101 in the case of data corruption with a compulsory ID (cor_id=1). In case of corruption, all current states are ignored. The FIFO buffer is emptied and the state machine returns to IDLE state 801 via branch A when the FIFO buffer is empty (fifo_empty).

What is claimed is:

1. A method of trace packet decompression comprising the steps of:
  storing immediately prior assembled trace data;
  detecting whether a trace packet includes trace data;
  if the trace packet includes data
    detecting whether a trace packet includes a compression map having individual bits indicating transmission or nontransmission of a plurality of corresponding equal sized sections of trace data;
    if no compression map is detected, then decoding a next portion of the trace packet as corresponding sections of trace data, and
    if a compression map is detected, then decoding each successive section of the trace packet as a next most significant section of trace data for which a corresponding compression map bit indicated transmission and assembling trace data including said decoded sections of the trace data and sections of the stored immediately prior assembled data corresponding to sections of the trace data for which said corresponding compression map bit indicated nontransmission;
  detecting corruption of an ID marker; and
  if a corrupted ID marker is detected, then waiting for a first-in-first-out buffer to empty while ignoring all data and repeating detecting whether a trace packet includes trace data after the first-in-first-out buffer empties.

2. The method of trace packet decompression of claim 1, further comprising the steps of:
  following detecting whether the trace packet includes data and decoding any data, detecting whether the trace packet includes a data address; and
  if the trace packet includes a data address, then decoding each successive section of the trace packet as a next most significant section of the data address until an invalid data address section occurs and assembling the data address including said valid and decoded sections and substituting corresponding sections of immediately prior transmitted data address for said invalid sections.

3. The method of trace packet decompression of claim 2, further comprising the steps of:
  following detecting whether the trace packet includes a data address and decoding any data address, detecting whether the trace packet includes a program counter address; and
  if the trace packet includes a program counter address, then decoding each successive section of the trace packet as a next most significant section of the program counter address until an invalid program counter address section occurs and assembling the program counter including said valid and decoded sections and substituting corresponding sections of immediately prior transmitted program counter address for said invalid sections.

4. A method of trace packet decompression of comprising the steps of:
  storing immediately prior assembled trace data;
  detecting whether a trace packet includes trace data;
  if the trace packet includes data detecting whether a trace packet includes a compression map having individual bits indicating transmission or non-transmission of a plurality of corresponding equal sized sections of trace data;

if no compression map is detected, then decoding a next portion of the trace packet as corresponding sections of trace data, and if a compression map is detected, then decoding each successive section of the trace packet as a next most significant section of trace data for which a corresponding compression map bit indicated transmission and assembling trace data including said decoded sections of the trace data and sections of the stored immediately prior assembled data corresponding to sections of the trace data for which said corresponding compression map bit indicated non-transmission;

detecting corruption of data; and if a corrupted data is detected, then waiting for a first-in-first-out buffer to empty while ignoring all data and repeating detecting whether a trace packet includes data after the first-in-first-out buffer empties.

5. The method of trace packet decompression of claim 4, further comprising the steps of:

following detecting whether the trace packet includes data and decoding any data, detecting whether the trace packet includes a data address; and if the trace packet includes a data address, then decoding each successive section of the trace packet as a next most significant section of the data address until an invalid data address section occurs and assembling the data address including said valid and decoded sections and substituting corresponding sections of immediately prior transmitted data address for said invalid sections.

6. The method of trace packet decompression of claim 5, further comprising the steps of:

following detecting whether the trace packet includes a data address and decoding any data address, detecting whether the trace packet includes a program counter address; and if the trace packet includes a program counter address, then decoding each successive section of the trace packet as a next most significant section of the program counter address until an invalid program counter address section occurs and assembling the program counter including said valid and decoded sections and substituting corresponding sections of immediately prior transmitted program counter address for said invalid sections.

* * * * *